United States Patent [19]

Hewitt et al.

[11] 4,083,710

[45] Apr. 11, 1978

[54] METHOD OF FORMING A METAL PATTERN ON AN INSULATING SUBSTRATE

[75] Inventors: John Norman Hewitt, Kendall Park; Victor Christiano, Hamilton Square, both of N.J.

[73] Assignee: RCA Corporation, New York, N.Y.

[21] Appl. No.: 761,427

[22] Filed: Jan. 21, 1977

[51] Int. Cl.$^2$ .............................................. C03C 27/02
[52] U.S. Cl. ............................................ 65/40; 65/44; 65/55; 65/59 R; 65/59 B
[58] Field of Search .................... 65/40, 44, 55, 59 R, 65/59 B; 156/272

[56] References Cited

U.S. PATENT DOCUMENTS 3,328,145  6/1967  McMillan et al. ............... 65/59 R X
3,397,278  8/1968  Pomerantz ...................... 65/59 B X

*Primary Examiner*—Arthur D. Kellogg
*Attorney, Agent, or Firm*—E. M. Whitacre; D. S. Cohen; G. E. Haas

[57] ABSTRACT

A first die having a relief pattern is employed to provide predetermined shape and relative positioning for a first plurality of metal strips. A second die is similarly employed for a second plurality of metal strips. Without removing the metal strips from the dies, the strips, still in predetermined shape and position, are bonded to opposing surfaces of an insulating substrate. The bonding process includes bringing the dies, and hence, the metal strips, into contact with the opposing surfaces of the insulating substrate. The bonding process may include the application of heat, pressure, and an electrical field across the bonding interfaces, e.g., anodic bonding.

20 Claims, 5 Drawing Figures

METHOD OF FORMING A METAL PATTERN ON AN INSULATING SUBSTRATE

BACKGROUND OF THE INVENTION

This invention relates to a method of forming a metal pattern on a surface of an insulating substrate, and particularly to such a method in which a single tool is employed both to form and bond the metal pattern to the insulating substrate.

Display devices have been proposed which include a plurality of spaced parallel glass plates which are disposed between a back surface and a front viewing surface. The back surface includes a cathode area and the front viewing surface includes a phosphor screen. In order to provide sufficient cathode current for an attractive display, the cathode area may further include a multiplier section. The multiplier section typically includes a plurality of dynodes which are disposed in staggered relation between each pair of the parallel glass plates. In addition to the dynodes, the display device typically includes a plurality of electrodes for controlling operation of the device. It is desirable that the dynodes and the electrodes be accurately disposed on, and adequately bonded to, the glass plates. Further information on these display devices can be found in copending application, Ser. No. 672,122 filed Mar. 31, 1976, entitled, "Parallel Vane Structure for a Flat Display Device" and in copending applications, Serial Nos. 641,631 now U.S. Pat. No. 4,001,620 and 644,502 now U.S. Pat. No. 4,025,325 filed Dec. 17, 1975, each of which is entitled, "Modulation Mask for an Image Display Device."

Although there are processing techniques which are amenable for fabrication of separate ones of the necessary dynodes and electrodes on each of the glass plates, these methods are not satisfactory for large scale operation, i.e., forming accurately registered patterns on areas of about 1 × 30 inches (25cm × 75cm) and glass thicknesses of 20 to 30 mils (500 to 750 micrometers). Another problem is that the dynode and electrode pattern, which may be nonplanar in nature, may require highly accurate registration and shaping for an improved display. Thus, techniques such as evaporation, sputtering and plating are impractical. In this connection, see copending application, Ser. No. 714,358, filed Aug. 16, 1976, entitled, "Electron Multiplier with Beam Confinement Structure."

Thus, it would be desirable to develop a method of forming the dynode and electrode pattern for the previously described display device.

SUMMARY OF THE INVENTION

A method of forming a metal pattern on at least one surface of an insulating substrate includes bringing a plurality of metal strips into contact with a die having a predetermined relief pattern thereon so as to shape and position the strips in accordance with the relief pattern. The shaped and positioned metal strips are then bonded to the surface of the insulating body while the die continues to hold the strips in the predetermined position until they are bonded to the insulating body.

DETAILED DESCRIPTION OF THE INVENTION

Figure 1:
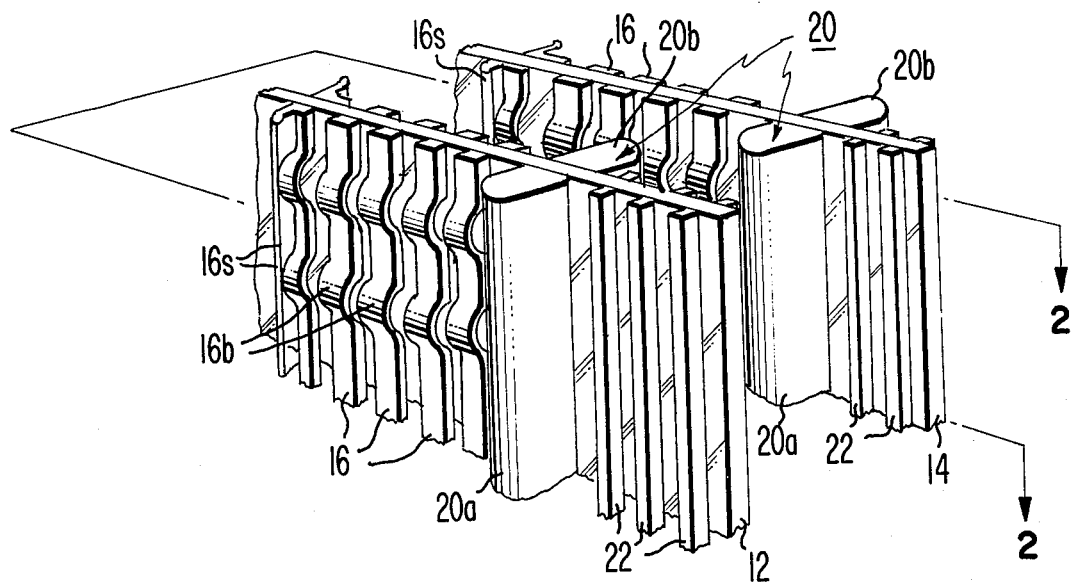
FIG. 1 is a portion of a perspective view showing a metal pattern of dynodes and electrodes formed on a pair of insulating vanes in accordance with the method of the present invention.
Figure 2:
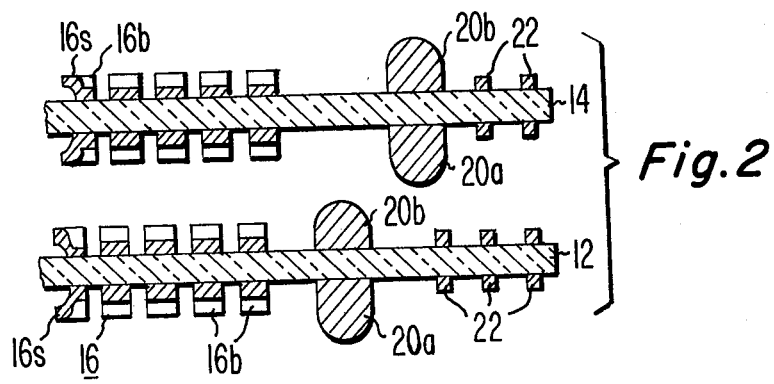
FIG. 2 is a sectional view taken along line 2—2 of FIG. 1.

Referring initially to FIGS. 1 and 2, two spaced, parallel flat insulating vanes 12 and 14 are shown having nonplanar dynode and electrode structure formed thereon using the method of the present invention. The insulating vanes 12 and 14 may be of a conventional glass material, e.g., soda-lime silicate glass, and have a thickness of about 20 to 30 mils (500 to 750 micrometers). The dynode and electrode structure constitute a metal pattern which may comprise strips of metal, such as aluminum, or aluminum-magnesium, with typical thicknesses of about 1 to 6 mils (25 to 150 micrometers). A plurality of the dynodes 16 are disposed on the surfaces of the glass vanes 12 and 14 in spaced parallel relation. The dynodes 16 on the facing surfaces of the vanes 12 and 14 are in staggered relation so as to enhance electron multiplication therethrough.

Some of the dynodes 16 include nonplanar structure, e.g., bumps 16b are disposed periodically along their length. The bumps 16b form channels therebetween for confining an electron beam. Further information on the confinement bumps 16b can be found in previously mentioned copending application, Ser. No. 714,358. Some of the dynodes 16 include ion shields 16s for preventing feedback ions from striking the dynodes. Further information on the ion shields 16s can be found in copending application, Serial No. 679,841 filed Apr. 23, 1976, entitled, "Electron Multiplier with Ion Bombardment Shields."

At the output of the dynodes 16 is a high energy electron filter 20. The high energy electron filter 20 is comprised of two staggered parallel bodies 20a and 20b which each extend slightly more than half-way between the vanes 12 and 14. Beyond the output of the high energy electron filter 20 are a plurality of spaced parallel electrodes 22 for controlling operation of the display device (not shown). The electrodes 22 may perform the functions of extracting, modulating and accelerating electrons toward a cathodoluminescent screen (not shown). It is to be noted that high level operation of the display device requires that the entire dynode and electrode pattern on the glass vanes be accurately formed and registered both on individual glass vanes as well as on opposing surfaces of adjacent glass vanes.

Figure 3:
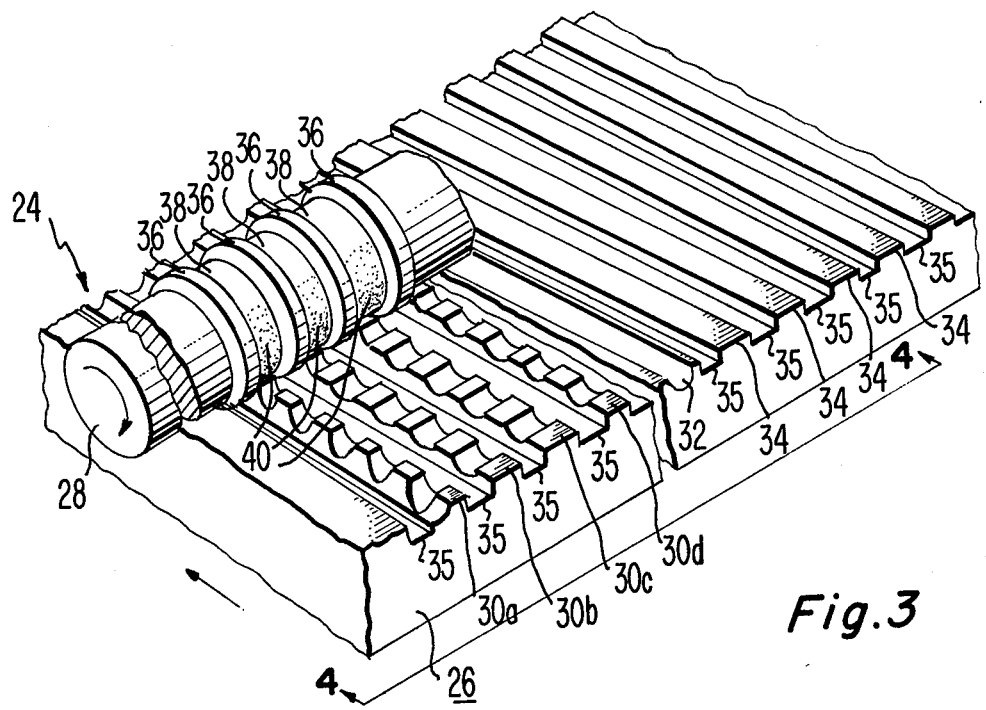
FIG. 3 is a perspective view showing a portion of an apparatus suitable for use in the method of the present invention.
Figure 4:
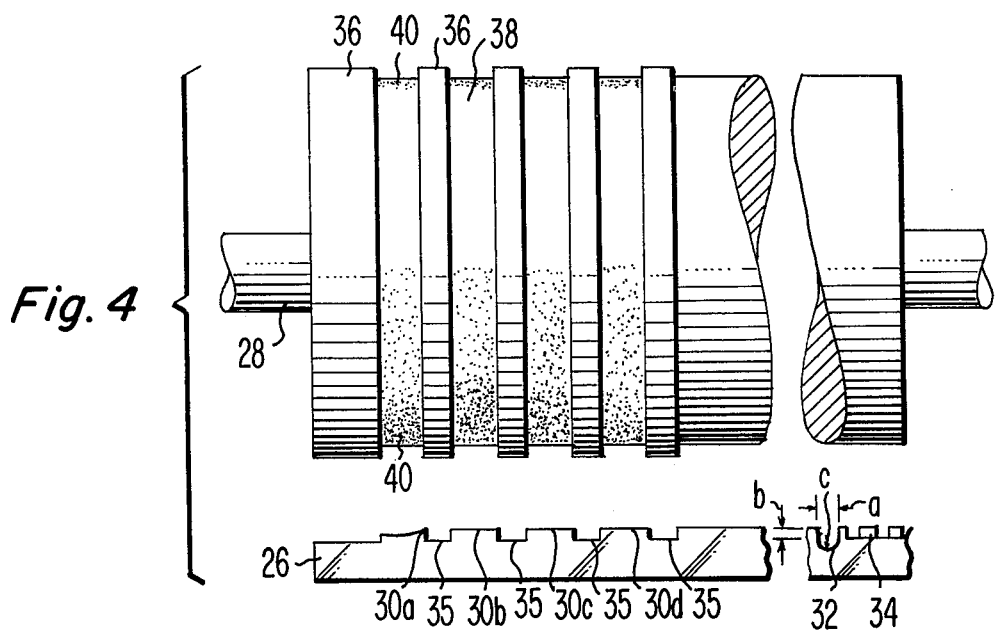
FIG. 4 is a portion of an enlarged and exploded edge view of the apparatus of FIG. 3 taken along line 4—4.

One apparatus for forming the dynode and electrode patterns shown in FIGS. 1 and 2 is shown in FIGS. 3 and 4. The apparatus 24 includes a flat plate die 26 and a roller 28. The die 26 is of a suitable hard material, e.g., steel, and includes a predetermined relief pattern on a surface thereof. This relief pattern is designed to correspond to the desired dynode, filter, and electrode structure of FIGS. 1 and 2. More particularly, the relief pattern on the die 26 includes: a first plurality of discrete strip relief patterns 30a . . . d, a single strip relief pattern 32; and a second plurality of substantially identical discrete relief patterns 34. By the term, strip relief pattern, it is meant the strip relief pattern present on the die 26.

The discrete strip relief patterns 30a . . . d correspond to the dynodes 16 of FIGS. 1 and 2 with strip relief pattern 30a including means for forming the ion shield 16s. The strip relief patterns 32 and 34 correspond to the filter 20 and the electrodes 22, respectively. Between, and parallel to, each pair of the adjacent strip patterns 30a . . . d, 32 and 34 are roller ridge receiving grooves 35.

The roller 28 consists of alternate sections of metal ridges 36 and grooves 38. In the roller grooves 38 are elastomer belts 40. The roller 28 is designed with its ridges 36 of the necessary spacing and size so that the roller 28 can be rolled across the die 26 with the roller ridges 36 in tight slip fit meshing relation with the receiving grooves 35 in the die 26. The outside diameter of the roller groove 38 with the elastomer belt 40 is of a magnitude such that, when the roller 28 meshes with the die 26, there remains an amount of volume between the elastomer belt 40 and the die 26 which is approximately equal to the metal strip which is to be shaped and bonded. This aspect of the invention will be discussed more fully later.

Exemplary dimensions for the dynode and electrode structure of FIGS. 1 and 2, and the corresponding die and roller of FIGS. 3 and 4 are as follows: The dynodes 16 and electrodes 22 are formed from flat strips of aluminum-magnesium e.g., 0.40% to 0.70% Mg, which are about 1 to 3 mils (25–50 micrometers) in thickness and about 40 mils (1000 micrometers) in width. The ion shields 16s may vary from about 6 to 12 mils (150 to 300 micrometers) in height and about 1-3 mils (25–75 micrometers) in width. The confinement bumps 16b range from 8 to 25 mils (200 to 625 micrometers) in height and appear every 60 mils (1500 micrometers) along the strip length. The high energy filter 20 includes solid bodies 20a and 20b of metal, e.g., aluminum, which are somewhat hemispherical in shape, having a width of 30 mils (750 micrometers) and a height of 24 mils (600 micrometers).

The die 26 includes receiving grooves 35 which are 20 mils (500 micrometers) wide and 50 mils (1250 micrometers) deep. The strip relief patterns 30a . . . d, which correspond to the dynodes 16, range in depth from about 8 to 25 mils (200 to 625 micrometers) and have a width of 40 mils (1000 micrometers). The strip relief patterns 30a . . . d are spaced in 60 mil (1500 micrometers) periods. The dimensions of the strip relief pattern 32 which corresponds to the filter 20 are: width, $a = 30$ mils; depth, $b = 8$ mils; and radius, $c = 16$ mils (FIG. 4). The strip relief patterns 34 which correspond to the electrodes 22 are typically about 40 mils (1000 micrometers) wide.

The roller 28 has a diameter of about 3 inch (7.5 cm) and roller ridges 36 which are 20 mils (500 micrometers) wide. The roller grooves 38 are 40 mils (1000 micrometers) wide and include elastomer belts 40 of sufficient thickness so that the O.D. of the elastomer belt 40 is about 50 mils (1250 micrometers) less than the O.D. of the roller ridges 36. The thickness of the elastomer belt 40 is about 30 mils (750 micrometers).

Generally, in the operation of the apparatus 24 shown in FIGS. 3 and 4, strips of the metal which are to be shaped and bonded to the glass vanes are positioned in the strip relief patterns 30a . . . d, 32, and 34. This can be simply accomplished by feeding the metal strips into the roller grooves 38 and then moving the roller 28 across the surface of the die 26 so that the die 26 and roller 28 are engaged in tight slip fit mesh relation. Note that the metal strips which are positioned on the strip relief patterns 30a . . . d and 34 are the previously described flat strips, while the metal strips which are positioned in the strip relief patterns 32 (filter) are strips which have a circular cross-section, e.g., an aluminum wire having a diameter of 16 mils (400 micrometers). As the roller 28 is moved across the die 26, the elastomer volume plus the metal strip volume approximately equals the volume of the space between the metal portion of the roller groove 36 and the die 26 so that the unshaped metal strips are forced to conform to the relief pattern provided by the die 26; i.e., each of the relief patterns 30a . . . d, 32 and 34 is transferred to the appropriate metal strip and proper spacing between the strips is maintained. Also, during shaping, the presence of the elastomer provides substantially uniform pressure distribution. An important feature of the method of the present invention is that, while being shaped, the strips are prevented from slipping laterally within the die due to the presence of the roller ridges 36.

In order to ensure that the now shaped and properly positioned metal strips remain in proper alignment until they are bonded to the glass, a weak metal to metal adhesive solution may be employed. For example, one satisfactory solution may be made with the adhesive which is commercially available from the 3M Company under the designation, "Shipping Mate." The adhesive solution may be applied to either the die surface, or the metal strip surface which is to contact the die. Also, during strip shaping, it is convenient to place the die 26 on a moving base whose movement is synchronized with respect to the rotational speed of the roller 28. When forming electrode patterns over relatively large areas, as here, the pressure of the roller elastomer belt 40 against the unshaped metal strips and die relief patterns 30a . . . d, 32 and 34 need only be sufficient to form the metal strip into an appropriate shape in the die surface over incremental distances determined by the curvature of the roller 28. Note that the thickness and softness of the elastomer belts 40 must be chosen to minimize force necessary to squeeze the elastomer (and metal strips) into die strip relief patterns. An important consequence of the roller-die combination is that, with regard to strip relief patterns 30a . . . d, the as yet unpressed (and unshaped) section of the metal strip close to the part being shaped is not pinned between the roller 28 and the die 26. Also, a highly polished surface on the die strip relief pattern also reduces pinning. Hence, there is ample metal strip material available to provide for the new longer length surface being formed without needing to stretch the metal strip excessively. This reduces the chance of metal snapping or being weakened by a flow or deep draw (stretching) process and allows use of relatively thinner metal strips. The thinner metal strips are generally easier to work with than the relatively thicker metal strips. In addition, the thicker metal strips are generally more difficult to bond to glass.

After the roller has contacted the unshaped metal strips over the entire active area of the die 26, the properly shaped and positioned metal strips are retained in the die 26 and held in the desired alignment therein to await the next processing: bonding of the shaped and aligned metal strips to the glass vanes 12 and 14 so as to result in the structures shown in FIGS. 1 and 2. During bonding, the die 26 is employed to maintain proper shape and positioning and to provide bonding support in order to bond the exposed surface of each of the now shaped and positioned metal strips to the appropriate glass vane.

Generally, the bonding process includes the application of heat and pressure to the metal to glass interface formed when the die 26, which now includes properly shaped and positioned metal strips, is brought into contact with the glass vane. A preferred method is an anodic bonding technique which includes the application of a voltage across the bonding interface in addition to the application of heat and pressure. Typically, the anodic bonding conditions for a metal strip thickness of 1 mil (25 micrometers) are as follows: temperature of about 240° C; pressure of about 1500 to about 2000 psi; voltage of from about 500 to 700 volts, current of from about 80 to 100mA. During this bonding, the current falls by about 50% due to ion migration in the glass. In order to provide the structure shown in FIGS. 1 and 2, it is necessary to bond two separate metal patterns to the opposing surfaces of each of the glass vanes 12 and 14 with the metal pattern on the opposing surfaces of the glass vanes 12 and 14 being substantially identical. The second bond can be accomplished by reversing the polarity across the interfaces. However, the electrical characteristics of the glass are generally permanently altered by the first bond so that the parameters of the second bond should take into consideration these changes. The conditions for the second bond (reversed polarity) are approximately the same as those of the first bond although the time is increased. Additional information on this process can be found in U.S. Pat. No. 3,397,278, entitled "Anodic Bonding", issued Aug. 13, 1968 to Pomerantz and in copending application, Ser. No. 681,695, filed Apr. 29, 1976, entitled "Method of Forming Dynodes."

After the metal pattern has been formed and bonded to the glass, the structure is then activated to form the secondary emissive surfaces needed for the dynodes 16. Activation may comprise heating and oxidizing the structure. Such an activation process is set forth in U.S. Pat. No. 2,527,981, entitled, "Secondary Electron Emission," issued Oct. 31, 1950 and in previously mentioned copending application, Ser. No. 681,695.

In some instances, it may be desirable to form a portion of the metal pattern through one pass of the roller 28 across the die 26 while providing another portion of the pattern through another method. For example, the shape and size of the filter 20 of FIGS. 1 and 2 may be more conveniently obtained by preforming the filter 20 and placing the shaped filter 20 into the appropriate strip relief pattern 32 where it is bonded to the glass vane along with the rest of the metal pattern. Alternatively, the filter 20 may be preformed and then separately bonded, e.g., anodically, to the glass vane. In either of these cases, the strip relief pattern 32 provides no shaping function. The filter 20 could also be bonded to a metallized glass vane so as to include a metal to metal bond.

Figure 5:
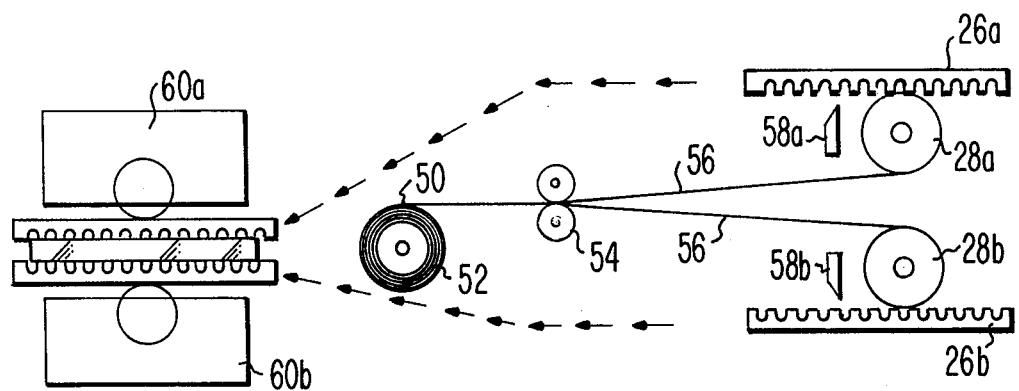
FIG. 5 is a flow chart showing one form of the method of the present invention.

One convenient process for performing the shaping and bonding steps necessary to produce the structure of FIGS. 1 and 2 is shown in FIG. 5 in the form of a flow chart. Unshaped metal foil 50 of the desired thickness is uncoiled from a roll 52 and then passed through a slitter 54 where it is formed, i.e., cut or slit, into unshaped metal strips 56 of the desired widths. The metal strips 56 are then fed into two grooved press rollers 28a and 28b which cooperate with two dies 26a and 26b to form properly shaped and spaced metal strips as previously described. After the desired metal pattern has been formed on each of the dies 26a and 26b, cutters 58a and 58b are employed to cut the strips to the proper length. At this point, when each of the dies 26a and 26b includes the shaped and properly positioned metal strips, the dies 26a and 26b are brought into pressing contact with a glass vane 12. Conventional roller presses 60a and 60b can be employed to provide the necessary bonding pressure so as to bond the strips to both surfaces of the glass vane. If desired, the bonding process may include anodic bonding, as previously described. With regard to the flow chart of FIG. 5, it should be noted that aluminum wires for the filter (not shown) can be placed in the appropriate strip relief patterns before the flat metal strips are fed into the grooved press rollers 28a and 28b.

In connection with the bonding operation shown in FIG. 5, it is preferable that the exposed surfaces of the metal strips which are positioned in the dies 26a and 26b form approximately coplanar surfaces at the moment when these surfaces are bonded to the opposing surfaces of the glass. Thus, it is desirable, prior to bonding, to press the exposed metal strips in each of the dies 26a and 26b into an extremely flat smooth surface. This can accomplished by pressing a uniform plate of glass against the exposed surfaces of the metal strips. In addition, in order to ensure full contact during bonding, it is desirable that one of the dies 26a and 26b be a "flexing" die and the other be a "rigid" die, i.e., one of the dies is made of heavy thick steel while the other die is thin and flexible. The use of such a combination of dies allows any of the remaining surface errors to be conformed to by the flexing die and glass surface so as to result in substantially full contact during bonding. Also, in order to ensure accurate dimensional transfer from the die to the glass and to avoid time loss and stresses induced by thermal cycling, it is desirable to perform the entire sequence shown in FIG. 5 at the elevated temperature necessary for good bonding.

The process shown in FIG. 5 produces glass vanes which include metal dynodes and electrodes meeting the high tolerances required in the previously mentioned display devices. In particular, the short range dimensional variations in bump shapes 16b can be kept under ± 1 mil (± 25 micrometers). The short range variations in dynode width can be kept under 0.5 mil (± 12.5 micrometers). The long range registration of the pattern over the 30 inch length can be kept within ± 1 mil (± 25 micrometers) variations. Finally, alignment of the patterns on both sides of the glass vane can be kept under ± 1 mil (± 25 micrometers).

Although the method of the present invention has been described with particular apparatus, modifications thereto as well as other forms of apparatus can be employed. For example, the roller-flat die apparatus previously described can be varied so that each of the elastomer belts contains the conjugate patterns of the relief patterns present in the die. This may be desirable in instances where the metal strips are difficult to work. On the other hand, the elastomer belts can be omitted; instead, the roller may include a conjugate metal pattern. However, this technique will require an increased amount of machinery precision so as to ensure a proper mesh between the roller and the die. Also, instead of a roller contacting a flat die, a flat trough tool that contains elastomer strips can also be employed (not shown). In such a case, shaping would be done in pressing fashion, i.e., deep drawing, rather than in rolling fashion. If desired, the flat trough and die system can be modified so as to include a sliding wedge type trough tool (not shown). This modification will allow for point by point application of the pressing force where pinning of the metal is a concern.

The method of the present invention is not limited to the dimensions and geometries shown for either the tool or the glass vanes; other geometries, shapes and sizes may be substituted. An advantage of the method of the present invention is that the tool which is used to accurately shape and position the metal strips also functions to ensure that the metal strips are registered to high tolerance over large distances by serving as a holding substrate for the bonding operation where the accurately shaped and properly positioned metal strips are transferred to the glass vane. Thus, a single tool provides the functions of: accurately shaping the metal strips; establishing accurate registration; and bonding. Another advantage of this method is that it can be readily implemented into state of the art production line systems, see FIG. 5.

Although the method of the present invention has heretofore been described in connection with shaping by pressing, other shaping techniques may be substituted. For example, embossing or coining techniques can be employed to shape the metal strips. This can be done by employing a system without an elastomer which, for example, includes a die and a roller. In such a method, flow of metal occurs rather than simple metal forming. An advantage of this type of method is that it can be performed with or without the presence of heat.

We claim:

1. A method of forming a metal pattern on at least one surface of a solid insulating substrate, comprising the steps of:
    (a) pressing a plurality of metal strips into contact with a die having a predetermined relief pattern thereon and conforming the strips to at least portions of said die so as to shape and position said strips in accordance with said relief pattern and releasably securing the strips to said die; and then
    (b) placing said surface of said solid insulating body into contact with said shaped and positioned metal strips while holding said strips on said die in said predetermined position and holding the insulating body against said strips until said strips are bonded to said insulating body.

2. A method in accordance with claim 1 in which said predetermined relief pattern comprises a plurality of discrete strip relief patterns, each of which corresponds to a separate one of said metal strips, wherein step a) includes bringing separate ones of said metal strips into contact with said corresponding discrete strip relief patterns.

3. A method in accordance with claim 2 in which step a) includes applying pressure on said metal strips so as to cause said strips to conform to said die relief patterns.

4. A method in accordance with claim 3 which includes applying pressure incrementally along the length of said metal strips.

5. A method in accordance with claim 4 in which said die includes a substantially flat surface having said relief patterns thereon which method includes moving a roller across said metal strips.

6. A method in accordance with claim 3 in which step a) includes substantially preventing lateral spreading of said metal strips.

7. A method in accordance with claim 3 in which step a) includes providing a substantially uniform pressure distribution between said die and said metal strips.

8. A method in accordance with claim 3 in which step b) includes the application of heat and pressure.

9. A method in accordance with claim 8 in which step b) includes anodic bonding.

10. A method in accordance with claim 3 in which step a) is separately performed with at least two of said dies.

11. A method in accordance with claim 10 in which step b) comprises bonding said shaped and positioned metal strips on each of said dies to opposing surfaces of said insulating body.

12. A method in accordance with claim 11 in which step b) includes the application of heat and pressure.

13. A method in accordance with claim 12 in which step b) includes anodic bonding.

14. A method of forming a metal pattern on a solid insulating substrate, comprising the steps of:
    (a) forming a plurality of metal strips from a foil of said metal;
    (b) pressing said metal strips into contact with a die having a predetermined relief pattern thereon and conforming the strips to at least portions of said die so as to shape and position said strips in accordance with said relief pattern and releasably securing the strips to said die; and
    (c) bringing said strip containing die into pressing contact with said solid insulating body and holding the insulating body against said strips so as to bond said shaped and position metal strips to said insulating body.

15. A method in accordance with claim 14 in which step b) is separately performed with two of said dies and in which step c) comprises bonding said shaped and positioned metal strips on each of said dies to opposing surfaces of said insulating body.

16. A method in accordance with claim 15 in which one of said dies is more rigid than the other.

17. A method in accordance with claim 15 in which said insulating body comprises glass.

18. A method in accordance with claim 17 which includes the application of heat and pressure.

19. A method in accordance with claim 18 in which said insulating body comprises soda-lime silicate glass.

20. A method in accordance with claim 9 in which step c) includes anodic bonding.

* * * * *

UNITED STATES PATENT OFFICE
CERTIFICATE OF CORRECTION

PATENT NO. : 4,083,710

DATED : April 11, 1978

INVENTOR(S) : John Norman Hewitt, et al

It is certified that error appears in the above-identified patent and that said Letters Patent are hereby corrected as shown below:

Column 8 line 57          "9" should be --19--.

Signed and Sealed this

Eighth Day of August 1978

[SEAL]

Attest:

RUTH C. MASON
*Attesting Officer*

DONALD W. BANNER
*Commissioner of Patents and Trademarks*